US008903151B2

(12) United States Patent
Bao et al.

(10) Patent No.: US 8,903,151 B2
(45) Date of Patent: Dec. 2, 2014

(54) SYSTEM AND METHOD FOR ASSESSING OPERATION OF AN IMAGING SYSTEM

(75) Inventors: Zhonghao Bao, Rochester, MN (US); Scott O Stiving, Rochester, MN (US); Kiaran P McGee, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 441 days.

(21) Appl. No.: 13/335,080

(22) Filed: Dec. 22, 2011

(65) Prior Publication Data

US 2012/0177270 A1 Jul. 12, 2012

Related U.S. Application Data

(60) Provisional application No. 61/425,961, filed on Dec. 22, 2010.

(51) Int. Cl.
*G06K 9/00* (2006.01)
*G06K 9/62* (2006.01)

(52) U.S. Cl.
CPC .......... *G06K 9/00214* (2013.01); *G06K 9/6206* (2013.01)
USPC .......................................... 382/131; 382/128

(58) Field of Classification Search
CPC ... G06K 9/00; G06K 9/00214; G06K 9/6206; G06T 11/003
USPC .......... 382/100, 128–132; 600/101, 109, 112, 600/114, 117–118, 139, 145, 178, 420, 424, 600/427, 434, 587; 128/920; 700/245
See application file for complete search history.

(56) References Cited

U.S. PATENT DOCUMENTS

| | | | | |
|---|---|---|---|---|
| 5,229,717 A * | 7/1993 | Hinks | .......................... | 324/309 |
| 5,841,891 A * | 11/1998 | Windig et al. | ................ | 382/131 |
| 5,870,495 A | 2/1999 | Mancuso et al. | | |
| 6,603,989 B1 * | 8/2003 | Yablonskiy | ................... | 600/410 |
| 7,027,853 B2 * | 4/2006 | Ma | ................. | 600/410 |
| 7,970,194 B2 * | 6/2011 | Kimura | ........................ | 382/131 |
| 8,594,400 B2 * | 11/2013 | Darrow et al. | ................ | 382/128 |
| 2011/0211744 A1 * | 9/2011 | Darrow et al. | ................ | 382/131 |

OTHER PUBLICATIONS

Alshennawy, et al., Edge Detection in Digital Images Using Fuzzy Logic Technique, World Academy of Science, Engineering and Technology, 2009, 51:178-186.

Betrouni, et al., Volume Quantification by Fuzzy Logic Modelling in Freehand Ultrasound Imaging, Ultrasonics, 2009, 49:646-652.

(Continued)

*Primary Examiner* — Hadi Akhavannik
*Assistant Examiner* — Mehdi Rashidian
(74) *Attorney, Agent, or Firm* — Quarles & Brady, LLP (57) ABSTRACT

A system and method for assessing the operation of a imaging system, such as magnetic resonance imaging (MRI) system, is disclosed including a that computer is programmed to access an image of a phantom from image data, identify a plurality of seed point in the image of the phantom using a shape recognition algorithm, and rank combinations of the seed points using a pattern recognition algorithm using a priori information about the predefined pattern. The computer is programmed to rank the combinations of the seed points to generate an indication of an imaging quality characteristic of the imaging system.

18 Claims, 9 Drawing Sheets

(56) References Cited

OTHER PUBLICATIONS

Cheng, et al., A Novel Approach to Microcalcification Detection Using Fuzzy Logic Technique, IEEE Transactions on Medical Imaging, 1998, 17(3):442-450.

Fitzpatrick, Automated Quality Assurance for Magnetic Resonance Image with Extensions to Diffusion Tensor Imaging, Master's Thesis, Virginia Polytechnic Institute and State University, Jun. 2005, 133 pages.

Lashkia, Defect Detection in X-Ray Images Using Fuzzy Reasoning, Image and Vision Computing, 2001, 19:261-269.

Liao, et al., A Fast Spatial Constrained Fuzzy Kernel Clustering Algorithm for MRI Brain Image Segmentation, Proceedings of the 2007 International Conference on Wavelet Analysis and Pattern Recognition, Beijing, China, Nov. 2-4, 2007, pp. 82-87.

Vermandel, et al., Combining MIP Images and Fuzzy Set Principles for Vessels Segmentation: Application to TOF MRA and CE-MRA, Proceedings of the 29th Annual International Conference of the IEEE EMBS Cite Internationale, Lyon, France, Aug. 23-26, 2007, pp. 6255-6258.

* cited by examiner

SYSTEM AND METHOD FOR ASSESSING OPERATION OF AN IMAGING SYSTEM

CROSS-REFERENCE TO RELATED APPLICATIONS

This application is based on, claims priority to, and incorporates herein by reference U.S. Provisional Patent Application Ser. No. 61/425,961 filed on Dec. 22, 2010, and entitled "SYSTEM AND METHOD FOR ASSESSING OPERATION OF A MEDICAL IMAGING SYSTEM."

STATEMENT REGARDING FEDERALLY SPONSORED RESEARCH

Not applicable.

BACKGROUND OF THE INVENTION

The field of the invention is a method and system for assessing the operation of imaging systems and, in particular, a method and system for automation-assisted assessment of the operational characteristics of, for example, a magnetic resonance imaging (MRI) system.

In a magnetic resonance imaging (MRI) system, when a substance such as human tissue is subjected to a uniform magnetic field (polarizing field $B_0$), the individual magnetic moments of the excited nuclei in the tissue attempt to align with this polarizing field, but precess about it in random order at their characteristic Larmor frequency. If the substance, or tissue, is subjected to a magnetic field (excitation field $B_1$) that is in the x-y plane and operating near the Larmor frequency, the net aligned moment, $M_z$, may be rotated, or "tipped" into the x-y plane to produce a net transverse magnetic moment $M_t$. A signal is emitted by the excited nuclei or "spins" after the excitation signal $B_1$ is terminated, and this signal may be received and processed to form an image.

Periodically, MRI and other medical imaging devices require testing to ensure that they meet certain performance specifications. Because the resolution and accuracy of the machines may change over time, without these routine inspections the machines could begin generating images that do not provide sufficient detail or accuracy to make useful diagnoses. To maintain certification of MRI devices, therefore, a site may establish a weekly quality control (QC) protocol. Generally, the QC protocols require that the machine being certified scan a number of phantoms that have known structures and configurations. By comparing the images of the phantoms captured by the device with the known structure of the phantoms themselves, it is possible to evaluate, analyze, and tune the performance of the imaging device or otherwise evaluate an operational characteristic of the device.

Phantoms can be manufactured using various materials such as aqueous paramagnetic solutions; pure gels of gelatin, agar, polyvinyl alcohol, silicone, polyacrylamide, or agarose; organic doped gels; paramagnetically doped gels; and reverse micelle solutions. The materials are generally selected for their detectability by the particular imaging device to be certified. In each phantom, the materials are formed into well-defined structures. Multiple phantoms, each having different structures and incorporating different materials may make-up a particular QC protocol configured to test many characteristics of a particular imaging device.

In the case of MRI devices, one QC protocol requires the imaging and analysis of eight separate image quality metrics. Because the compliance process requires manual calculation and analysis of each of the eight image quality metrics, the process can be time consuming and prone to human error. Furthermore, as the compliance processes and associated phantoms are updated and modified in view of upgrades in MRI technology, it is necessary to continually update the associated QC processes and analysis procedures. If all of the required QC protocols are implemented by humans, the possibility of human error may increase substantially.

Figure 1:
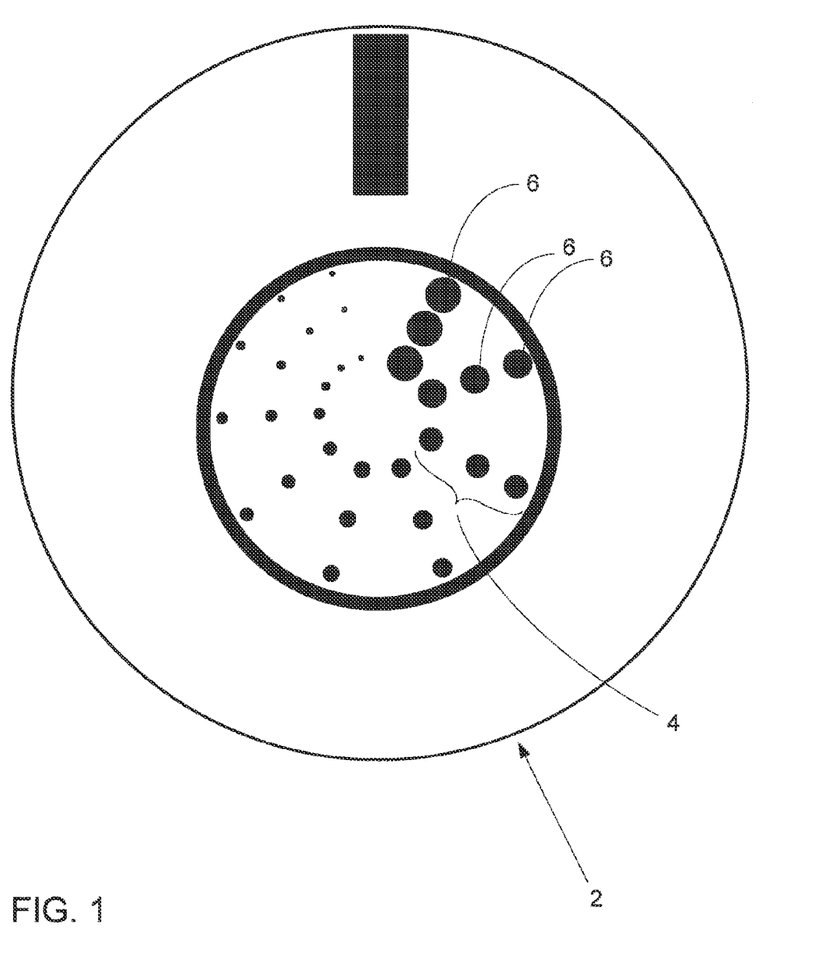
FIG. 1 is an illustration of an example LCD resolution pattern generated after scanning a phantom.

For current MRI devices, a Low Contrast Detectability (LCD) test has been developed. The LCD test assesses the extent to which objects of low-contrast are discernible in four separate axial slices. FIG. 1 is an illustration of an example LCD resolution pattern generated after scanning a phantom object such as an LCD phantom. In each slice of the phantom (FIG. 1 illustrates a view taken through a single slice of the phantom), the low contrast objects appear as rows 4 of small disks 6, with each row radiating from the center of a circle as in spokes of a wheel as shown in FIG. 1. The contrast levels are the same in each slice and decrease in slice order throughout the phantom. The spoke count starts with the first spoke having the largest diameter disks, and rotates clockwise until a spoke is reached where one or more of the disks are not discernible from the background. The number of complete spokes detected or successfully imaged is the score for a particular slice. FIG. 1 shows an example phantom, but other phantoms having different configurations of disks, or alternative shapes in place of the disks may also be used for LCD testing.

LCD resolution patterns (such as that shown in FIG. 1) are important tests for the verification of diagnostic image quality generated by a medical imaging device. Although the human visual system is extremely sensitive to the detection of low contrast objects, there is substantial room for subjectivity in analyzing the images. Furthermore, due to the need to discern important information from subtle differences in the images, automation of the LCD tests by computer analysis is difficult. As a result, trained or expert observers perform the LCD tests requiring time consuming manual intervention and interaction.

Accordingly, there is a need for systems and methods to reduce the regular burden of performing analysis of low contrast resolution detection tests.

SUMMARY OF THE INVENTION

The present invention overcomes the aforementioned drawbacks by providing an automated system and method for performing imaging system performance analysis using low contrast detectability tests. Specifically, the present invention employs a series of automated analysis steps and uses fuzzy logic algorithms to overcome the difficulties with automated analysis of images acquired for purposes of assessing medical imaging system performance.

In particular, the present invention provides a magnetic resonance imaging (MRI) system. The MRI system includes a magnet system configured to generate a polarizing magnetic field about at least a portion of a phantom arranged in the MRI system. The phantom includes a known structure and a slice of the known structure includes a plurality of geometric shapes arranged in a predefined pattern. The MRI system includes a plurality of gradient coils configured to apply a gradient field to the polarizing magnetic field, a radio frequency (RF) system configured to apply an excitation field to the phantom and acquire MR image data therefrom, a host computer and a remote workstation computer. The remote computer is programmed to reconstruct an image of the phantom from the MR image data (although the host computer or another computer could be used), identify a plurality of seed pixels in the image of the phantom using a fuzzy shape recognition algorithm, and rank combinations of the seed pixels using a fuzzy pattern recognition algorithm using a priori information about the predefined pattern. The computer is programmed to rank the combinations of the seed pixels to generate an indication of an imaging quality characteristic of the MRI system.

Other implementations include an MRI system comprising a magnet system configured to generate a polarizing magnetic field about at least a portion of a quality-control phantom arranged in the MRI system. The MRI system has a set of known imaging characteristics associated with the image. The MRI system includes a plurality of gradient coils configured to apply a gradient field to the polarizing magnetic field, a radio frequency (RF) system configured to apply an excitation field to the phantom and acquire MR image data therefrom, and a computer. The computer is programmed to access an image of a quality-control phantom acquired using the MRI system, conduct a first image analysis process of the image using a fuzzy shape recognition algorithm to identify a plurality of seed pixels in the image, and conduct a second image analysis process of the image using a fuzzy pattern recognition algorithm, the seed pixels, and a priori information about the quality-control phantom. The computer is programmed to generate an indication of a quality of the MRI system used to acquire the image of the quality-control phantom using results from the second image analysis process and the known imaging characteristics of the MRI system.

Other implementations include a computer readable storage medium having stored thereon instructions that, when executed by a computer processor, cause the computer processor to access an image of a quality-control phantom acquired using a magnetic resonance imaging (MRI) system having a set of known imaging characteristics associated with the image, conduct a first image analysis process of the image using a fuzzy shape recognition algorithm to identify a plurality of seed pixels in the image, and conduct a second image analysis process of the image using a fuzzy pattern recognition algorithm, the seed pixels, and a priori information about the quality-control phantom. The instructions cause the computer processor to generate an indication of a quality of the MRI system used to acquire the image of the quality-control phantom using results from the second image analysis process and the known imaging characteristics of the MRI system.

Other implementations include a method of evaluating a magnetic resonance imaging (MRI) system. The method includes accessing an image of a quality-control phantom acquired using an MRI system having a set of known imaging characteristics associated with the image, conducting a first image analysis process of the image using a fuzzy shape recognition algorithm to identify a plurality of seed pixels in the image, and conducting a second image analysis process of the image using a fuzzy pattern recognition algorithm, the seed pixels, and a priori information about the quality-control phantom. The method includes generating an indication of a quality of the MRI system used to acquire the image of the quality-control phantom using results from the second image analysis process and the known imaging characteristics of the MRI system.

Various other features of the present invention will be made apparent from the following detailed description and the drawings

DETAILED DESCRIPTION

Figure 2:
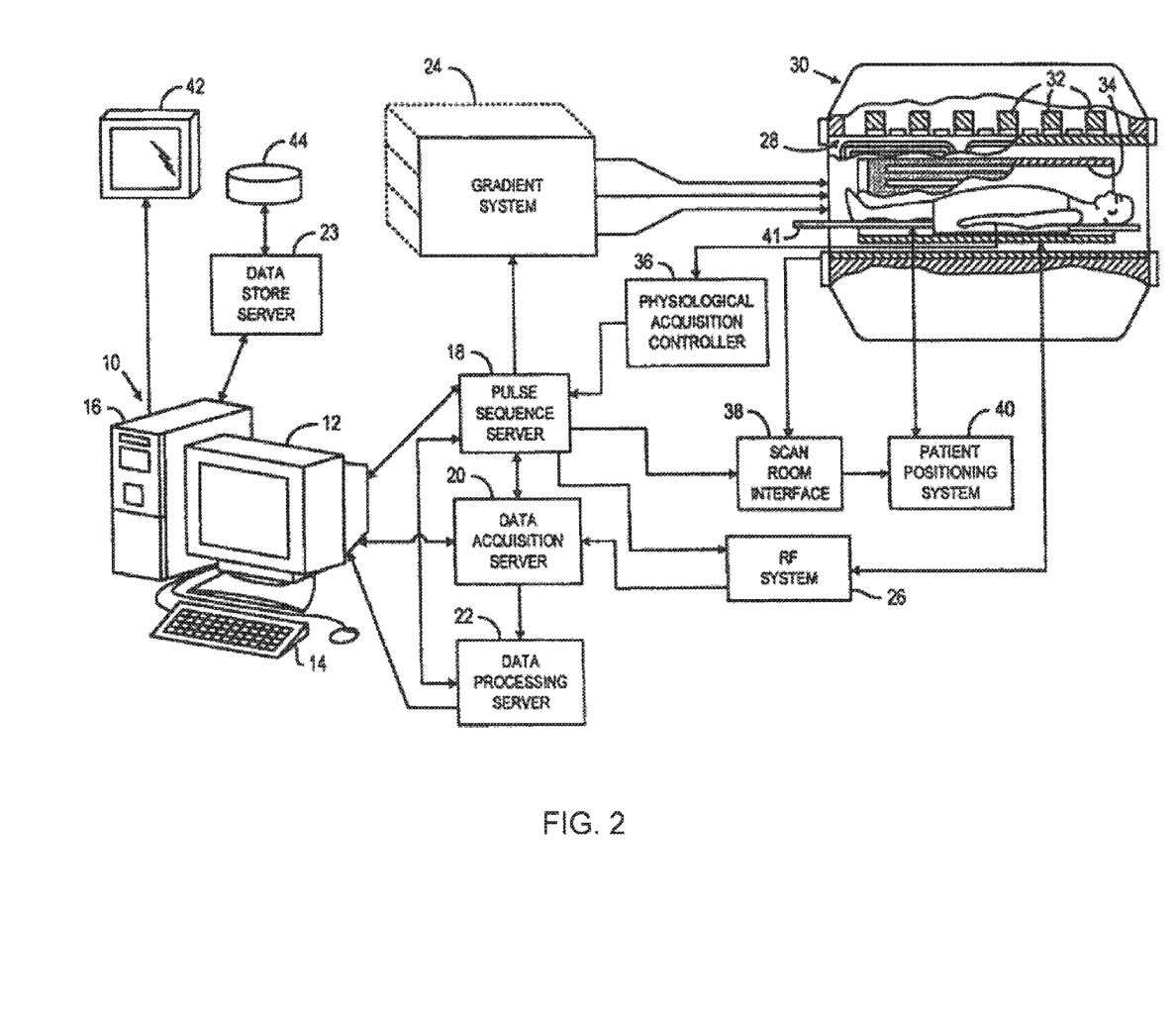
FIG. 2 is a block diagram of an MRI system that employs the present system.

Referring to FIG. 2, the present invention is employed using an MRI system. The MRI system includes a workstation 10 having a display 12 and a keyboard 14. The workstation 10 includes a processor 16 that is a commercially available programmable machine running a commercially available operating system. The workstation 10 provides the operator interface that enables scan prescriptions to be entered into the MRI system. The workstation 10 is coupled to four servers including a pulse sequence server 18, a data acquisition server 20, a data processing server 22, and a data storage server 23. The workstation 10 and each of servers 18, 20, 22 and 23 are connected to communicate with each other.

The pulse sequence server 18 functions in response to instructions downloaded from the workstation 10 to operate a gradient system 24 and an RF system 26. Gradient waveforms necessary to perform the prescribed scan are produced and applied to the gradient system 24 that excites gradient coils in an assembly 28 to produce the magnetic field gradients $G_x$, $G_y$, and $G_z$ used for position encoding MR signals. The gradient coil assembly 28 forms part of a magnet assembly 30 that includes a polarizing magnet 32 and a whole-body RF coil 34.

RF excitation waveforms are applied to the RF coil 34 by the RF system 26 to perform the prescribed magnetic resonance pulse sequence. Responsive MR signals detected by the RF coil 34 or a separate local coil (not shown in FIG. 1) are received by the RF system 26, amplified, demodulated, filtered, and digitized under direction of commands produced by the pulse sequence server 18. The RF system 26 includes an RF transmitter for producing a wide variety of RF pulses used in MR pulse sequences. The RF transmitter is responsive to the scan prescription and direction from the pulse sequence server 18 to produce RF pulses of the desired frequency, phase and pulse amplitude waveform. The generated RF pulses may be applied to the whole body RF coil 34 or to one or more local coils or coil arrays (not shown in FIG. 1).

The RF system 26 also includes one or more RF receiver channels. Each RF receiver channel includes an RF amplifier that amplifies the MR signal received by the coil to which it is connected and a detector that detects and digitizes the I and Q quadrature components of the received MR signal. The magnitude of the received MR signal may thus be determined at any sampled point by the square root of the sum of the squares of the I and Q components:

$$M=\sqrt{I^2+Q^2},$$

and the phase of the received MR signal may also be determined as follows:

$$\phi=\tan^{-1}Q/I.$$

The pulse sequence server 18 also optionally receives patient data from a physiological acquisition controller 36. The controller 36 receives signals from a number of different sensors connected to the patient, such as ECG signals from electrodes or respiratory signals from a bellows. Such signals are typically used by the pulse sequence server 18 to synchronize, or "gate", the performance of the scan with the subject's respiration or heart beat.

The pulse sequence server 18 also connects to a scan room interface circuit 38 that receives signals from various sensors associated with the condition of the patient and the magnet system. It is also through the scan room interface circuit 38 that a patient positioning system 40 receives commands to move the patient to desired positions during the scan.

The digitized MR signal samples produced by the RF system 26 are received by the data acquisition server 20. The data acquisition server 20 operates in response to instructions downloaded from the workstation 10 to receive the real-time MR data and provide buffer storage such that no data is lost by data overrun. In some scans the data acquisition server 20 does little more than pass the acquired MR data to the data processor server 22. However, in scans that require information derived from acquired MR data to control the further performance of the scan, the data acquisition server 20 is programmed to produce such information and convey it to the pulse sequence server 18. For example, during prescans, MR data is acquired and used to calibrate the pulse sequence performed by the pulse sequence server 18. Also, navigator signals may be acquired during a scan and used to adjust RF or gradient system operating parameters or to control the view order in which k-space is sampled. And the data acquisition server 20 may be employed to process MR signals used to detect the arrival of contrast agent in an MRA scan. In all these examples the data acquisition server 20 acquires MR data and processes it in real-time to produce information that is used to control the scan.

The data processing server 22 receives MR data from the data acquisition server 20 and processes the MR data in accordance with instructions downloaded from the workstation 10. Such processing may include, for example, Fourier transformation of raw k-space MR data to produce two or three-dimensional images, the application of filters to a reconstructed image, the performance of a backprojection image reconstruction of acquired MR data, the calculation of functional MR images, the calculation of motion or flow images, and the like.

Images reconstructed by the data processing server 22 are conveyed back to the workstation 10 where they are stored. Real-time images are stored in a data base memory cache (not shown) from which they may be output to operator display 12 or a display 42 that is located near the magnet assembly 30 for use by attending physicians. Batch mode images or selected real time images are stored in a host database on disc storage 44. When such images have been reconstructed and transferred to storage, the data processing server 22 notifies the data storage server 23 on the workstation 10. The workstation 10 may be used by an operator to archive the images, produce films, or send the images via a network to other facilities.

As shown in FIG. 2, the RF system 26 may be connected to the whole body rf coil 34, or as shown in FIG. 2, a transmitter section of the RF system 26 may connect to one RF coil and its receiver section may connect to a separate rf receive coil. Often, the transmitter section is connected to the whole body RF coil 34 and each receiver section is connected to a separate local coil.

Figure 3:
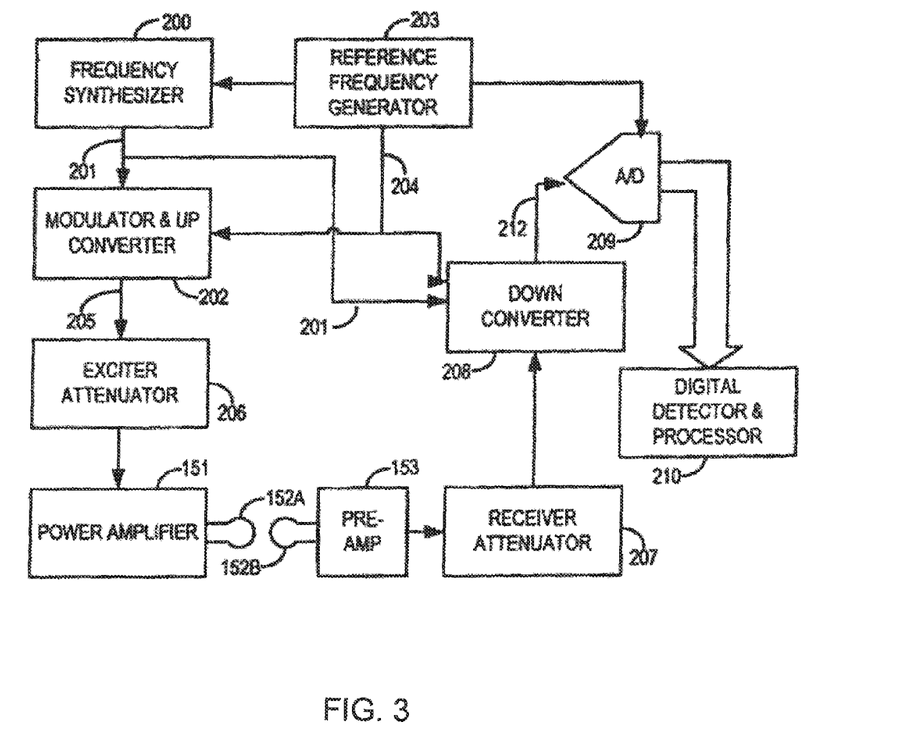
FIG. 3 is a block diagram of an RF system that forms part of the MRI system of FIG. 2.

Referring particularly to FIG. 3, an example RF system includes a transmitter that produces a prescribed RF excitation field. The base, or carrier, frequency of this RF excitation field is produced under control of a frequency synthesizer 200 that receives a set of digital signals from the pulse sequence server 18 (see FIG. 2). These digital signals indicate the frequency and phase of the RF carrier signal produced at an output 201. The RF carrier is applied to a modulator and up converter 202 where its amplitude is modulated in response to a signal R(t) also received from the pulse sequence server 18 (see FIG. 2). The signal R(t) defines the envelope of the RF excitation pulse to be produced and is produced by sequentially reading out a series of stored digital values. These stored digital values may be changed to enable any desired RF pulse envelope to be produced.

The magnitude of the RF excitation pulse produced at output 205 is attenuated by an exciter attenuator circuit 206 that receives a digital command from the pulse sequence server 18 (see FIG. 2). The attenuated RF excitation pulses are applied to the power amplifier 151 that drives the RF coil 152A.

Referring still to FIG. 3 the signal produced by the subject is picked up by the receiver coil 152B and applied through a preamplifier 153 to the input of a receiver attenuator 207. The receiver attenuator 207 further amplifies the signal by an amount determined by a digital attenuation signal received from the pulse sequence server 18 (see FIG. 2). The received signal is at or around the Larmor frequency, and this high frequency signal is down converted in a two step process by a down converter 208 that first mixes the MR signal with the carrier signal on line 201 and then mixes the resulting difference signal with a reference signal on line 204. The down-converted MR signal is applied to the input of an analog-to-digital (ND) converter 209 that samples and digitizes the analog signal and applies it to a digital detector and signal processor 210 that produces 16-bit in-phase (I) values and 16-bit quadrature (Q) values corresponding to the received signal. The resulting stream of digitized I and Q values of the received signal are output to the data acquisition server 20 (see FIG. 2). The reference signal as well as the sampling signal applied to the A/D converter 209 are produced by a reference frequency generator 203.

The present system and method provides an automated algorithm for the analysis of low contrast resolution images, such as LCD test images generated by a medical imaging device. Although the algorithm is general in its application and may be used in any number of applications requiring the analysis of low-contrast images, the present system and method may be particularly adapted to the analysis of a variety of low contrast resolution tests used in diagnostic imaging, such as when testing or certifying MRI devices. In one specific implementation, the system and method may be used to perform low contrast resolution testing on MR images of the American College of Radiology quality control (QC) test phantom.

Figure 4A:
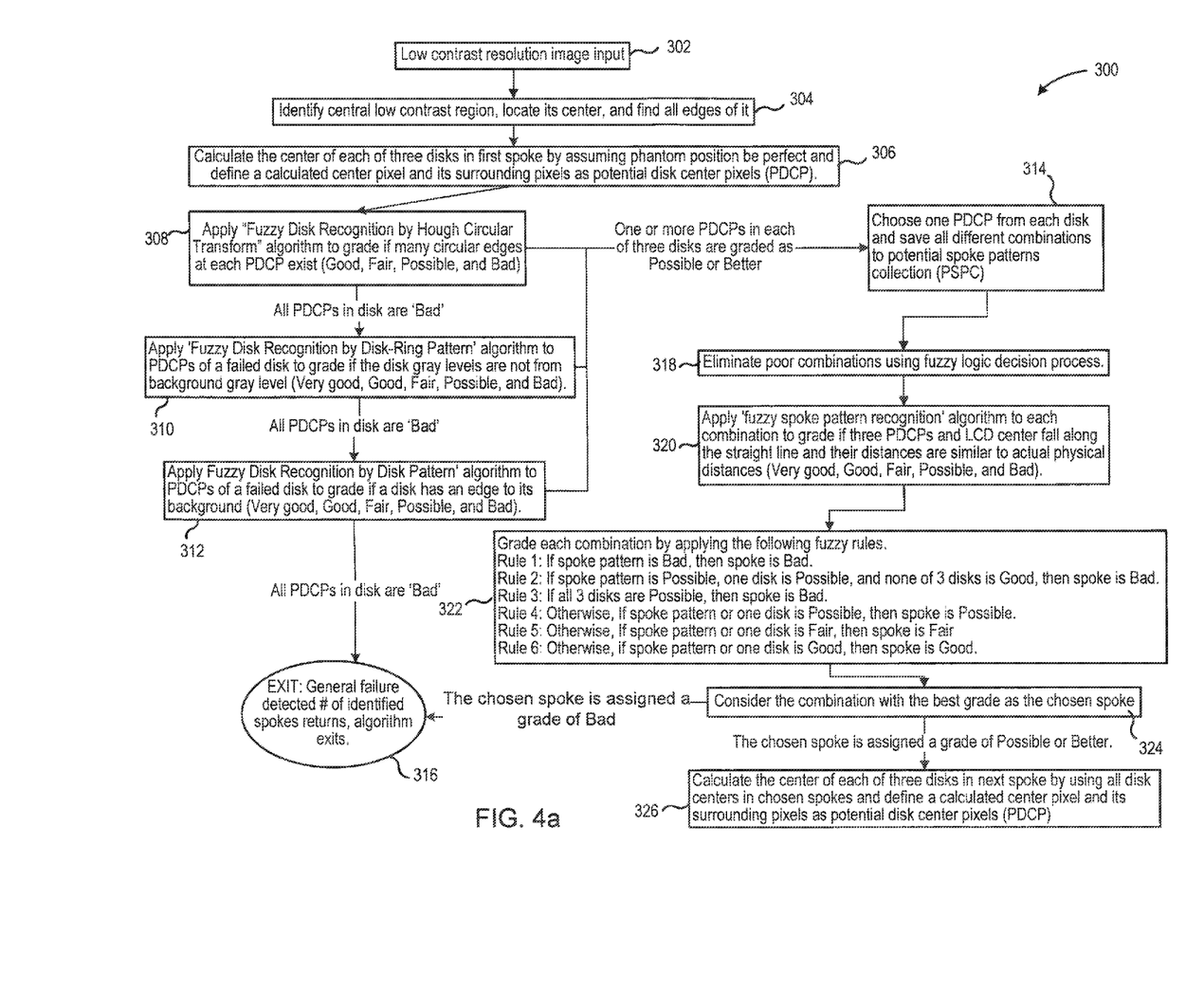
FIG. 4a is a flow chart setting forth the general steps of the method for performing LCD image analysis.

FIG. 4a is a flow chart setting forth the general steps of a method 300 for performing LCD image analysis. In one implementation, the method of FIG. 4a allows for an automated fuzzy logic analysis of LCD images generated by medical imaging devices such as MRI devices. Using the method, an inputted low-contrast input image is received from a medical imaging device and analyzed for its content. After the content of the image is analyzed to determine the shapes and structures presented in the image, the results are compared to the known structures found in the imaged phantom. By comparing the results, and scoring the outcome of the resulting comparison, the present system and method can determine whether the imaging device is capable of accurately imaging the phantom and, therefore, whether the device can generate useful and reliable output data.

The present system implements a series of algorithms for analyzing the inputted image. In one implementation, the system implements any of four image-processing algorithms including 1) fuzzy disk recognition by Hough circular transform, 2) fuzzy disk recognition by disk-ring pattern, 3) fuzzy disk recognition by disk pattern, and 4) fuzzy spoke pattern recognition, as described below. The first three algorithms, fuzzy disk recognition by Hough circular transform, fuzzy disk recognition by disk-ring pattern, and fuzzy disk recognition by disk pattern, are three subroutines that can be used in any combination to find and grade inner, middle, and outer disks (see, for example, the disks of inner ring 404, middle ring 406, and outer ring 408 of FIG. 4b). Generally, these algorithms are configured to identify initial seed pixels, which can be potential centers of disks formed within the phantom and imaged by the imaging device. The fuzzy spoke pattern recognition algorithm is configured to grade how well each of three estimated disk centers are located within a particular predefined geometrical pattern within the phantom. For example, when the phantom includes a plurality of geometrical shapes arranged in spokes radiating from a central region of the phantom, the algorithm may be used to grade how well each of the estimated disk centers radiates from the LCD center when all inner, middle, and outer disks are found.

In the implementation shown in FIG. 4a, the present system incorporates, generally, three stages. In the first stage (e.g., block 306 of FIG. 4a), the system determines a number of candidate seed pixels to be used during analysis of the low-contrast image. In some cases, the seed pixels include center pixels for each disk located within a particular geometrical feature of the phantom, such as a first spoke.

In the second stage (e.g., blocks 308, 310, and 312 of FIG. 4a), each of the seed pixels, or potential disk centers is evaluated to determine their accuracy as disk centers. Generally, the evaluation involves, for each seed pixel (i.e., potential center pixel0), determining whether a bright disk is found around the candidate seed pixel. If so, then the candidate center may be considered the correct center pixel of that particular disk. If not, then the candidate center pixel is not an actual center pixel and may be discarded. In the present disclosure, the second stage is implemented using various algorithms including fuzzy disk recognition by Hough circular transformations, fuzzy disk recognition by disk-ring pattern, and fuzzy disk recognition by disk pattern. But the algorithms used in evaluating the accuracy of the candidate center pixels may be implemented in any order, and, in some instances, other algorithms may be used.

In the third stage (e.g., blocks 314, 318, 320, 322 and 324 of FIG. 4a) having found one or more candidate center pixel for each disk in the spoke, a fuzzy spoke pattern recognition algorithm analyzes several combinations of potential center pixels to identify the center pixels that lay most accurately along the spoke. Then, the most accurate center pixels are selected and, if accurate center pixels were found, each of the disks in the spoke may be considered correctly imaged. The system then moves on to the next spoke or geometrical feature and repeats the process.

Figure 4B:
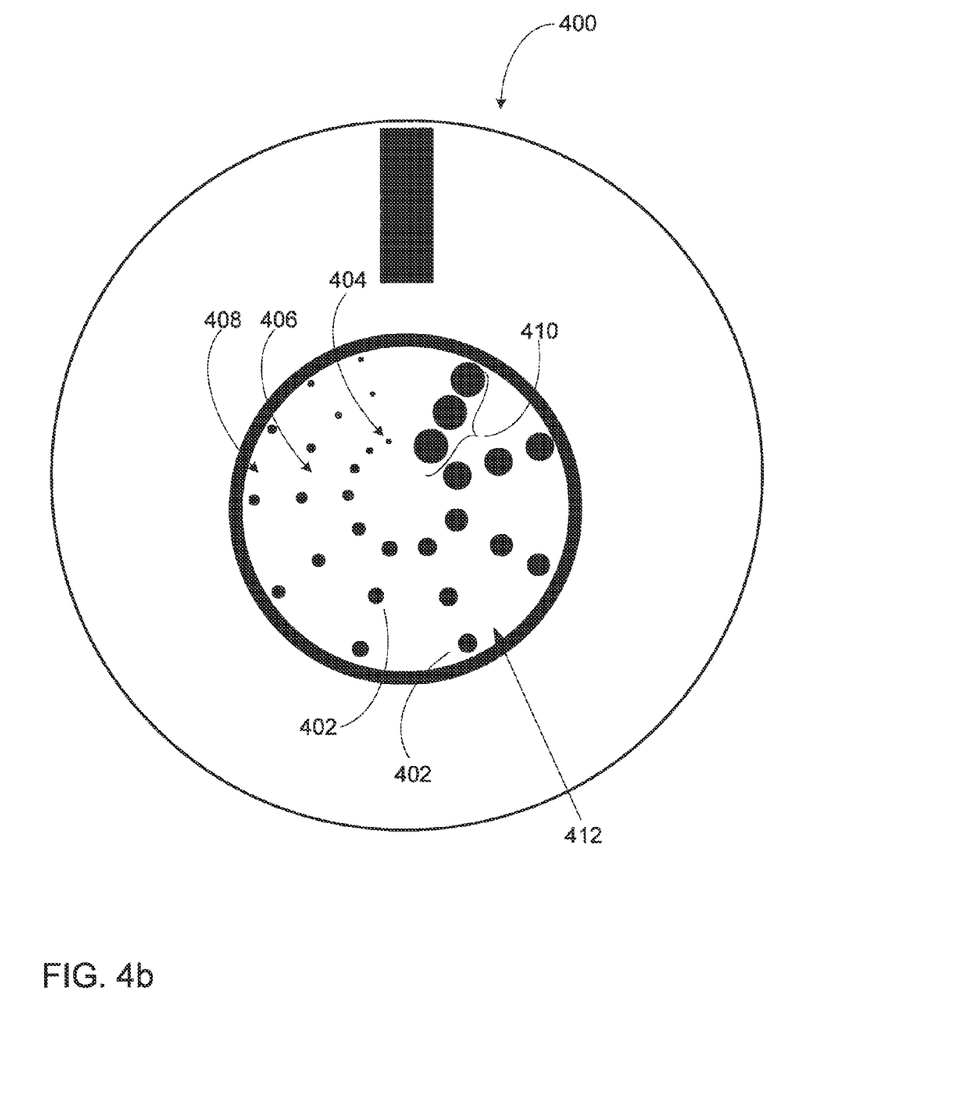
FIG. 4b is an LCD resolution pattern generated after scanning a phantom.

In this disclosure, method 300 is illustrated as applied to the low-contrast image 400 of FIG. 4b, however it is to be understand that method 300 could be used to perform analysis of a variety of images, such as low contrast images generated by a medical imaging device. The method 300 could be configured to analyze a low-contrast image where the position and size of disks 402 are altered and arranged in different patterns, or where disks 402 have alternate shapes.

Returning to FIG. 4a, in step 302, a low-contrast image (in this example, image 400 of FIG. 4b), is received from a medical imaging device at, for example, workstation 10 of FIG. 2. The low-contrast image is taken of a phantom object having a known internal structure. Using method 300, therefore, the capability of the medical imaging device to accurately image the phantom can be evaluated.

Image 400 is then analyzed in step 304 to identify the central low-contrast region 412. The center of the low-contrast region 412 is located and the edges of the low-contrast region 412 are identified. Steps 302 and 304 may be implemented in accordance with conventional image processing technologies, for example.

In step 306, using the a priori knowledge of the configuration of the imaged phantom and the disks 402 included therein, a first spoke 410 is selected and the center of each disk 402 in the spoke 410 is identified assuming that the position of the phantom is accurate (and, therefore, that disks 402 are located in their pre-determined position). Based upon those predetermined locations of the disk centers, the calculated center pixel of each disk and the surrounding pixels are each defined as potential disk center pixels (PDCPs) for each disk on the first spoke. Accordingly, the calculated PDCPs represent the center of each disk in spoke 410 had the phantom been imaged accurately.

Having calculated PDCPs for each disk 402 in a particular spoke in step 306, the system then uses each of the PDCPs to identify candidate circular edges formed around each PDCP in step 308 to rank the accuracy of the PDCPs. In one implementation, the system implements this fuzzy disk recognition using a Hough Circular Transform. The Hough Circular Transform identifies candidate circular edges which are then ranked by the system into several accuracy categories, such as Good, Fair, Possible, and Bad. The Hough Circular Transform uses edge detection and feature extraction techniques to identify each disk 402.

Figure 5:
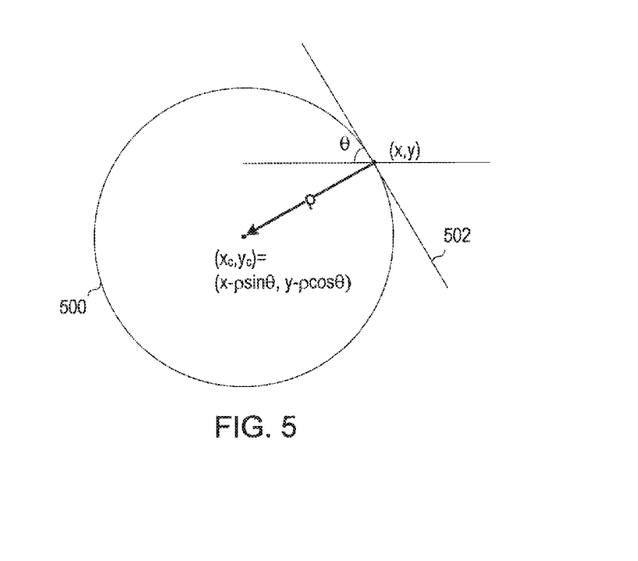
FIG. 5 is an illustration of a circle showing geometrical features useful in determining a center point of the circle.

It is an inherent characteristic of a disk (i.e., circle) that lines formed perpendicularly to the disk's edges pass through the disk's center. FIG. 5, for example shows circle 500. Vector p, shown in FIG. 5 is oriented perpendicularly to line segment 502, which lies parallel to the edge of circle 500 and contacts the circle at a single point (x,y). As shown in FIG. 5, vector ρ passes through the center $(x_c, y_c)$ of circle 500, as would any other vector similarly constructed. Therefore $(x_c, y_c)$ can be considered as a disk center when it is pointed towards by many edge perpendiculars (e.g., vector p).

As such, in an implementation using the Hough Circular transform, the procedure to grade a PDCP in accordance with step 308 of FIG. 4a may be implemented as follows. First, a Sobel operator may be used in a particular disk area to find all edges of the disk and record their intensities ($E_{xy}$) and angles ($\theta_{xy}$), as shown in FIG. 5. Second, a 2-d accumulation array S (with initial value 0) for possible disk centers is created. Third, using array S, the disk center $(x_c, y_c)$ of each edge point (x,y) is calculated by $x_c = x - \rho \sin \theta_{xy}$, and $y_c = y - \rho \cos \theta xy$, where ρ is disk radius (which is known a priori), and $\theta_{xy}$ is the edge angle at edge point (x,y) (see, for example, FIG. 5).

Figure 6:
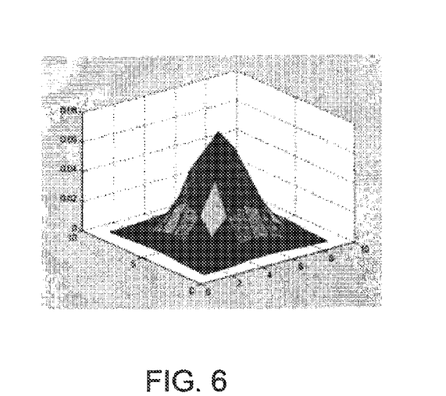
FIG. 6 is an illustration of an exemplary Gaussian filter.

Fourth, the fuzzy transformation at $(x_c, y_c)$ is then taken by applying a Gaussian filter so that each of the surrounding pixels $(x_{ci}, y_{cj})$ has a weight $W_{ij}$ indicating its likelihood of being the disk center from edge point (x,y). An example Gaussian filter for this operation is shown in FIG. 6.

Figure 7:
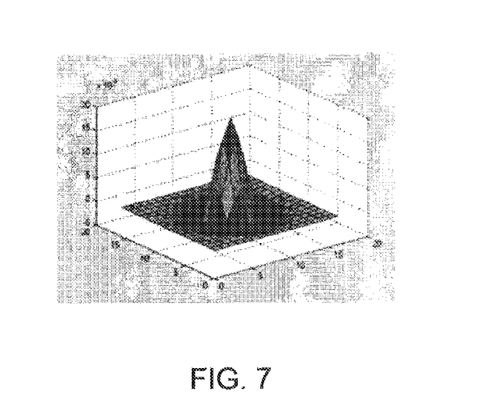
FIG. 7 is an illustration of the result of a Laplace modification of the Gaussian filter of FIG. 6.

Fifth, each product of weight $W_{ij}$ and the edge intensity $E_{xy}$ of edge (x,y) is added to the 2-d accumulation array S using $S(x_{ci},y_{cj})=S(x_{ci},y_{cj})+W_{ij} E_{xy}$. Sixth, a Laplacian of the Gaussian filter (see, for example, FIG. 7) is then applied to concentrate the highest value of the 2-d accumulation array S. Seventh, each potential disk center $(x_p,y_p)$ is graded by fuzzifying the value of $S(x_p,y_p)$ via the fuzzy set {Good, Fair, Possible, Bad} and triangular membership functions. Eighth, the best grade location $(x_b,y_b)$ is determined and the resolution increased by re-applying the third through seventh steps in 0.1 pixel increments for the region (Xb±0.5,Yb±0.5). The position of the best disk center is then stored by the system.

Returning to FIG. 4a, with the PDCPs generated and graded as a result of step 308, if one or more PDCP for each disk 402 in spoke 410 are ranked at least as high as 'Possible', the method moves to step 314. Alternatively, if all PDCPs for each disk 402 are ranked as bad, the method moves to step 310.

Figure 8:
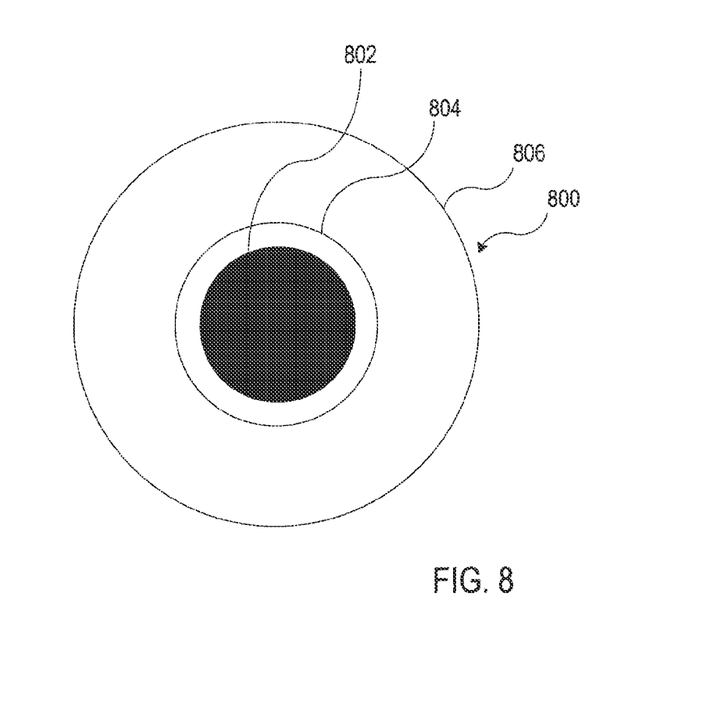
FIG. 8 is an illustration of an example disk-ring pattern defining a disk area and a background area.

In step 310, a fuzzy disk recognition by disk-ring pattern algorithm is implemented against the PDCPs of a disk having all 'Bad' PDCPs (as determined in step 308) in an attempt to identify and locate each of the disks in spoke 410. The algorithm uses a disk-ring template to identify and locate the edges of each of the disks. FIG. 8 is an illustration of an example disk-ring pattern 800 defining a disk area and a background area. The system positions disk ring pattern 800 over one or more of the PDCPs identified for a particular disk. The disk ring pattern can then be used to test whether the pixels surrounding the PDCP represent a disk. If not, then the PDCP is not accurate as the PDCP does not represent the center of a disk. Different disk-ring patterns 800 are defined for different disks having different sizes and/or shapes, with the dimensions of the disk-ring pattern 800 matching those of the disk to be identified.

Inside disk-ring pattern 800, center region 802 represents the LCD disk and has higher gray levels in the input image. Outer region 806 represents the LCD background surrounding each disk and has lower gray levels. A ring region 804 separates center region 802 and outer region 806. When using disk-ring pattern 800, the disk background region 806 is assumed to be normally distributed.

Given a disk-ring pattern such as that shown in FIG. 8, the procedure for grading a candidate PDCP of a disk may be implemented as follows. First, the center of disk-ring pattern 800 is placed on one of the candidate PDCPs generated in step 306 of FIG. 4a, with outer region (background) 802 and inner region 806 of the disk-ring pattern defining two independent regions surrounding the PDCP. Second, the mean and variance of background gray levels are estimated for the region of the low contrast input image falling within background region 802 of disk-ring pattern 800. Third, using the mean and variance of the background region 802, a significance level for each of the grades Good, Fair, and Possible is assigned for that background region. Fourth, a total number of disk pixels in a region defined by the inner region 806 of the disk pattern that are not from background distribution at each significance level are found. Fifth, moving from a grade of Good through Possible, the PDCP is given a ranking of Good, Fair, or Possible if the total number of disk pixels are greater than required at that level. Alternatively, the PDCP is assigned a ranking of Bad.

Generally, the variance of the background gray level in the low-contrast input image will be larger than normal cases if non-uniformity or ring noise exists. Non-uniformity may exist, for example, where the contrast of the input image varies at different locations within the image. Ring noise is demonstrated in an input image where the input image includes a number of visual distortions formed concentrically with the circular structures present in the phantom and imaged within the input image.

Figure 9:
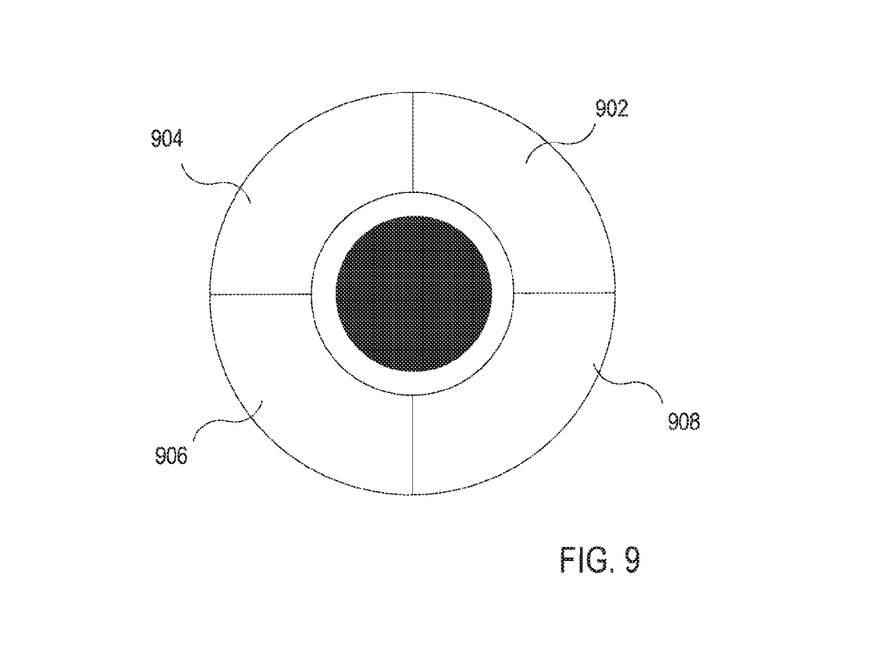
FIG. 9 is an illustration of a disk ring pattern divided into four areas.

In many cases, a large background variance results in a raised detection threshold that causes many disk points to be undetectable. As such, there are several methods that may be employed to reduce a large background variance if none of PDCPs are graded Possible or better. First, because non-uniformity can be approximated as a linear plane in a small area, a gray level plane of all background ring points can be calculated using a least squares method that can then be used to correct non-uniformity on all points in the template. Alternatively, the disk ring pattern may be divided into four areas 902, 904, 906, and 908 as shown in FIG. 9. In that case, the overall background mean and variance are defined as the average of the mean and variance calculated in each of the four areas. Of course, in other implementations, the background could be subdivided into any number of sections. Finally, all the LCD template points may be classified into three groups: dark strip, bright strip, and normal, for example. Disk points are then identified by the background distribution in each individual group and then overall disk points are used to determine disk grade.

Returning to FIG. 4a, if, after performing fuzzy disk recognition by disk-ring pattern, one or more PDCP for each disk 402 in spoke 410 is ranked as possible or better, the method moves to step 314. But if all PDCPs for each disk 402 in spoke 410 are ranked as bad, the method moves to step 312.

In step 312, a fuzzy disk recognition by disk pattern algorithm is applied to PDCPs of a failed disk to determine whether the disk has a defined edge to its background. The edge is ranked as Good, Fair, Possible, or Bad.

Figure 10:
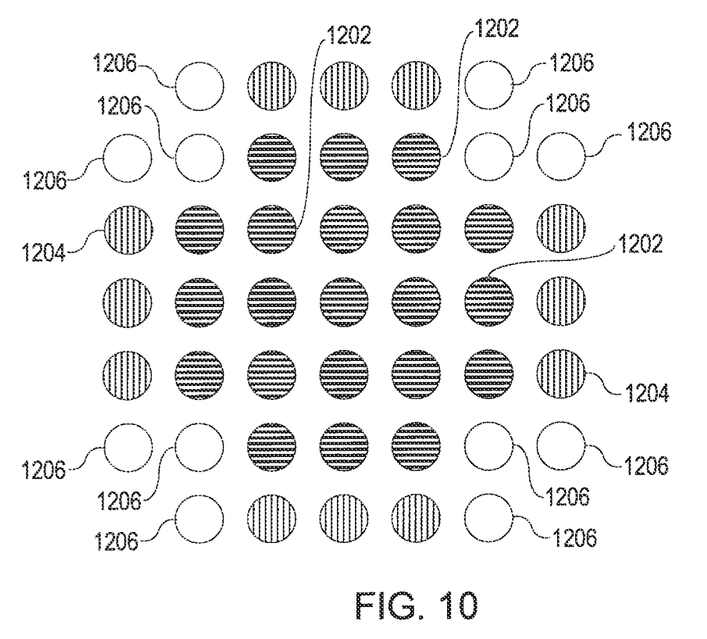
FIG. 10 is an illustration of an example disk pattern defining a disk area and its edge background.

In the fuzzy disk recognition algorithm, a disk pattern is defined that includes a collection of dots representing candidate pixels from the low-contrast image. FIG. 10 shows an example disk pattern 1200. Disk pattern 1200 includes inner points 1202 surrounding by several outer points 1204. Inner points 1202 represent LCD disk points having higher gray levels (e.g., disks 402 of FIG. 4b), while outer points 1204 represent LCD background points having lower gray levels. Pattern 1200 includes several corner points 1206. Generally, using pattern 1200, inner points 1202 may be considered potential disk pixels if all outer points 1204 have lower gray levels than their 4 nearest neighbor (4-nn) inner points 1202, and all corner points 1206 have lower gray levels than their 8 nearest neighbor (8-nn) inner points 1202.

Using pattern 1200, an example procedure to grade a particular disk and associated PDCP may be implemented as follows. First, given a particular PDCP, the Sobel method is used in the LCD area to find an edge threshold. Second, the disk patterns are calculated based upon disk size. Third, the center of disk pattern 1200 is placed on a PDCP. Fourth, given the position of disk pattern 1200, the mean gray levels of the inner points 1202 and the mean gray levels of the outer points 1204 and 1206 are calculated. Fifth, a potential disk center pixel is assigned a ranking of Bad if the mean difference between disk and its background is smaller than the edge threshold in LCD area.

Sixth, the gray level differences between 1) outer points 1204 and their 4-nn inner points 1202 and 2) corner points 1206 and their 8-nn inner points 1202 are calculated. Seventh, after calculating the gray level differences, the PDCP is ranked by fuzzifying the PDCP's minimal gray level differences via the fuzzy set {Good, Fair, Possible, Bad} and the triangular membership functions with parameters one, half, and zero of the edge threshold.

Returning to FIG. 4a, if, after performing fuzzy disk recognition using disk pattern 1200, one or more PDCP for each disk 402 in spoke 410 is ranked as possible or better, the method moves to step 314. But if all PDCPs for each disk 402 in spoke 410 are ranked as Bad, the method moves to step 316. In step 316, the method exits and indicates failure as only bad PDCP's have been discovered. As such, step 316 may indicate that the low-contrast image includes insufficient detail to identify the current spoke.

Figure 11:
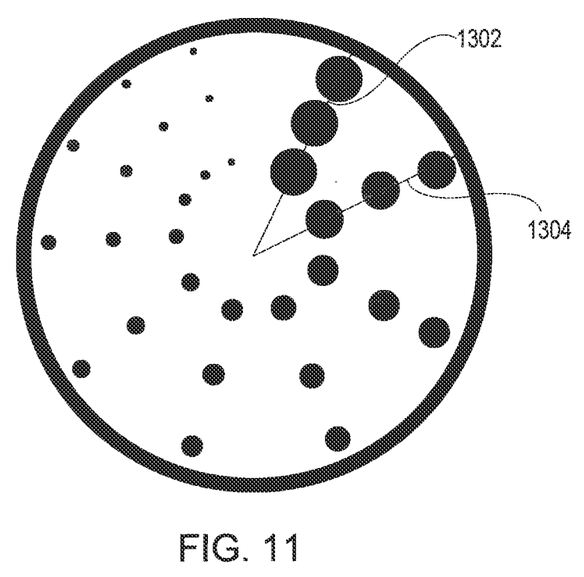
FIG. 11 is an illustration of a fuzzy spoke pattern algorithm showing two highlighted spokes.

In step 314, if, in either of steps 308, 310, and 312 one or more PDCPs for each disk 402 in row 410 were ranked as Possible or better, all possible combinations of PDCPs for each disk in a particular spoke are calculated. Then, in step 318, improbable combinations are eliminated, possibly using fuzzy logic, such as all three seed pixels graded as possible. After determining a set of candidate combinations of PDCPs, in step 320, a fuzzy spoke pattern recognition is used to determine the combination of PDCPs most likely to represent the set of center points for each disk 402 on spoke 410. As such, the fuzzy spoke pattern is used to grade the positions of candidate inner, middle, and outer PDCP combinations and, consequently, the inner, middle, and outer disks. FIG. 11 is an illustration of the fuzzy spoke pattern algorithm showing two spokes 1302 and 1304 calculated based upon the candidate positions of two spokes of disks.

The fuzzy spoke pattern algorithm may be implemented as follows: First, the spoke angle is estimated using the method of least squares given candidate inner, middle, outer seed pixels, and LCD center. Second, an error between each seed pixel and the one calculated from estimated spoke angle is calculated. Third, each candidate spoke pattern (combination) is ranked fuzzifying the spoke's average position error via a fuzzy set {Very good, Good, Fair, Possible, Bad} and the triangular membership functions with parameters 0.5 mm, 0.75 mm, 1.0 mm, and 1.5 mm, for example.

Returning to FIG. 4a, after ranking each spoke in step 320, the best spoke patterns are selected in step 322. The spoke patterns are ranked according to the following rules: First, if a spoke pattern is Bad, the spoke is Bad. Second, if a spoke pattern is Possible, one disk is Possible, and none of the three disks is Good, then the spoke is Bad. Third, if all three disks are Possible, the spoke is Bad. Fourth, otherwise, if the spoke pattern or one disk is Possible, the spoke is Possible. Fifth, otherwise, if the spoke pattern or one disk is Fair, then the spoke is Fair. Sixth, otherwise, if the spoke pattern or one disk is Good, the spoke is Good.

After ranking the spoke pattern, in step 324 the spoke pattern combination with the best grade is selected as the chosen spoke. If the chosen spoke is Bad, the method moves to step 316 and the system exits. Alternatively, if the chosen spoke has a ranking of Possible or better, the method moves to step 326 and the center of each of the three disks comprising the next spoke is calculated using all disk centers in the chosen spokes. In that case, a calculated center pixel and its surrounding pixels of the disks of the next spoke are defined as PDCPs.

After calculating PDCPs for the next spoke, the method returns to step 308 (arrow not shown on FIG. 4a) and continues for the remaining spokes of the low-contrast input image. As the PDCPs for each disk, the clarity of the disk for each PDCP, and the spoke pattern accuracy of various combinations of PDCPs are evaluated in accordance with the method illustrated in FIG. 4a, that information can be used to determine an operational characteristic (e.g., accuracy) of the MRI system generating the low-contrast image. If disks or their centers cannot be found, or are not found with a sufficiently high degree of accuracy, the MRI system may be determined to have failed the low-contrast imaging quality-control test. Such a failure may initiate recalibration or repair of the machine. Accordingly, the present system and method can generate an indication of a quality of an MRI system used to acquire an image of a quality-control phantom using results from the described imaging process using known imaging characteristics of the MRI system. Because the present system and method provides for an automated test, the low-contrast quality control tests can be evaluated quickly and accurately. As such, even as the number of quality control tests increases, the tests can be performed regularly to ensure that the MRI system is in good working order.

The present invention has been described in terms of the preferred embodiment, and it should be appreciated that many equivalents, alternatives, variations, and modifications, aside from those expressly stated, are possible and within the scope of the invention. Therefore, the invention should not be limited to a particular described embodiment

The invention claimed is:

1. A magnetic resonance imaging (MRI) system comprising:
    a magnet system configured to generate a polarizing magnetic field about at least a portion of a phantom arranged in the MRI system, the phantom including a known structure and a slice of the known structure including a plurality of geometric shapes arranged in a predefined pattern;
    a plurality of gradient coils configured to apply a gradient field to the polarizing magnetic field;
    a radio frequency (RF) system configured to apply an excitation field to the phantom and acquire MR image data therefrom; and
    a computer programmed to:
        reconstruct an image of the phantom from the MR image data, the image being a two-dimensional representation of the slice of the phantom;
        conduct a first image analysis process of the image to identify a plurality of seed pixels in the image of the phantom using a fuzzy two-dimensional shape recognition algorithm;
        conduct a second image analysis process of the image to rank combinations of the seed pixels using a fuzzy two-dimensional pattern recognition algorithm using a priori information about the predefined pattern and the plurality of seed pixels; and
        rank the combinations of the seed pixels to generate an indication of an imaging quality characteristic of the MRI system.

2. The MRI system of claim 1, wherein the combinations of the seed pixels comprise a common element of a geometric shape in the predefined pattern.

3. The MRI system of claim 2, wherein the predefined pattern includes a disk-ring pattern formed of a plurality of disks.

4. The MRI system of claim 1, wherein the fuzzy two-dimensional shape recognition algorithm includes at least one of a Hough transformation and a predefined pattern.

5. The MRI system of claim 1, wherein the geometric shapes arranged in the predefined pattern through the phantom include disks arranged in spokes and wherein the plurality of seed pixels include potential disk center pixels (PDCPs).

6. The MRI system of claim 5, wherein PDCPs are identified for each of a plurality of disks laying along a first spoke of the predefined pattern.

7. A computer system programmed to:
access an image of a quality-control phantom acquired using an MRI system, the image being a two-dimensional representation of a slice of the phantom;
conduct a first image analysis process of the image using a fuzzy two-dimensional shape recognition algorithm to identify a plurality of seed pixels in the image;
conduct a second image analysis process of the image using a fuzzy two-dimensional pattern recognition algorithm, the seed pixels, and a priori information about the quality-control phantom to identify a plurality of spoke patterns within the image; and
generate an indication of a quality of the MRI system used to acquire the image of the quality-control phantom using results from the second image analysis process and the known imaging characteristics of the MRI system.

8. The system of claim 7, wherein the fuzzy two-dimensional shape recognition algorithm includes at least one of a Hough transformation and a predefined pattern.

9. The system of claim 7, wherein:
the quality-control phantom includes a known structure and the slice of the known structure includes a plurality of geometric shapes arranged in a predefined pattern; and
the geometric shapes arranged in the predefined pattern include disks arranged in spokes and wherein the plurality of seed pixels include potential disk center pixels (PDCPs).

10. The system of claim 9, wherein PDCPs are identified for each of a plurality of disks laying along a first spoke of the predefined pattern.

11. A computer readable storage medium having stored thereon instructions that, when executed by a computer processor, cause the computer processor to:
access an image of a quality-control phantom acquired using a magnetic resonance imaging (MRI) system having a set of known imaging characteristics associated with the image, the image being a two-dimensional representation of a slice of the phantom;
conduct a first image analysis process of the image using a fuzzy two-dimensional shape recognition algorithm to identify a plurality of seed pixels in the image;
conduct a second image analysis process of the image using a fuzzy two-dimensional pattern recognition algorithm, the seed pixels, and a priori information about the quality-control phantom to identify a plurality of spoke patterns within the image; and
generate an indication of a quality of the MRI system used to acquire the image of the quality-control phantom using results from the second image analysis process and the known imaging characteristics of the MRI system.

12. The computer readable storage medium of claim 11, wherein the fuzzy two-dimensional shape recognition algorithm includes at least one of a Hough transformation and a predefined pattern.

13. The computer readable storage medium of claim 11, wherein:
the quality-control phantom includes a known structure and the slice of the known structure includes a plurality of geometric shapes arranged in a predefined pattern; and
the geometric shapes arranged in the predefined pattern include disks arranged in spokes and wherein the plurality of seed pixels include potential disk center pixels (PDCPs).

14. The computer readable storage medium of claim 13, wherein PDCPs are identified for each of a plurality of disks laying along a first spoke of the predefined pattern.

15. A method of evaluating a magnetic resonance imaging (MRI) system, comprising:
accessing an image of a quality-control phantom acquired using an MRI system having a set of known imaging characteristics associated with the image, the image being a two-dimensional representation of a slice of the phantom;
conducting a first image analysis process of the image using a fuzzy two-dimensional shape recognition algorithm to identify a plurality of seed pixels in the image;
conducting a second image analysis process of the image using a fuzzy two-dimensional pattern recognition algorithm, the seed pixels, and a priori information about the quality-control phantom to identify a plurality of spoke patterns within the image; and
generating an indication of a quality of the MRI system used to acquire the image of the quality-control phantom using results from the second image analysis process and the known imaging characteristics of the MRI system.

16. The method of claim 15, wherein the fuzzy two-dimensional shape recognition algorithm includes at least one of a Hough transformation and a predefined pattern.

17. The method of claim 15, wherein:
the quality-control phantom includes a known structure and the slice of the known structure includes a plurality of geometric shapes arranged in a predefined pattern; and
the geometric shapes arranged in the predefined pattern include disks arranged in spokes and wherein the plurality of seed pixels include potential disk center pixels (PDCPs).

18. The method of claim 17, wherein PDCPs are identified for each of a plurality of disks laying along a first spoke of the predefined pattern.

* * * * *